United States Patent [11] 3,617,084

[72] Inventor Jerry Mares
 5611 S. Parkside, Chicago, Ill. 60638
[21] Appl. No. 822,483
[22] Filed May 7, 1969
[45] Patented Nov. 2, 1971

[54] HAND-OPERATED SHOVEL FOR PICKING UP REFUSE
 2 Claims, 8 Drawing Figs.
[52] U.S. Cl..................................................... 294/50.6,
 294/106, 294/71
[51] Int. Cl....................................................... A01b 1/16
[50] Field of Search.......................................... 294/71, 19,
 50.8, 50.6, 21, 106, 30, 70, 50.9

[56] References Cited
 UNITED STATES PATENTS
1,882,423 10/1932 Holtz............................ 294/50.9
2,712,467 7/1955 Rice.............................. 294/50.8
1,938,419 12/1933 Fredlein........................ 294/106
2,710,765 6/1955 Arens............................ 294/50.6

Primary Examiner—Richard E. Aegerter
Assistant Examiner—Douglas D. Watts
Attorney—Burmeister, Palmatier & Hamby ABSTRACT: The shovel, which is especially well adapted for picking up pet manure or other similar refuse, comprises a pair of clamshell scoops pivotally mounted on supporting arms at the lower end of an outer tubular shaft. The scoops are biased toward their closed position by means of springs. An inner shaft is rotatably mounted within the outer shaft. First and second handles extend radially from the upper end portions of the inner and outer shafts so that the shovel can be held in both hands for easy operation. Lever arms extend radially from the lower end of the inner shaft and are connected to the scoops by means of links, so that the scoops can be opened and closed by turning the inner shaft.

PATENTED NOV 2 1971 3,617,084
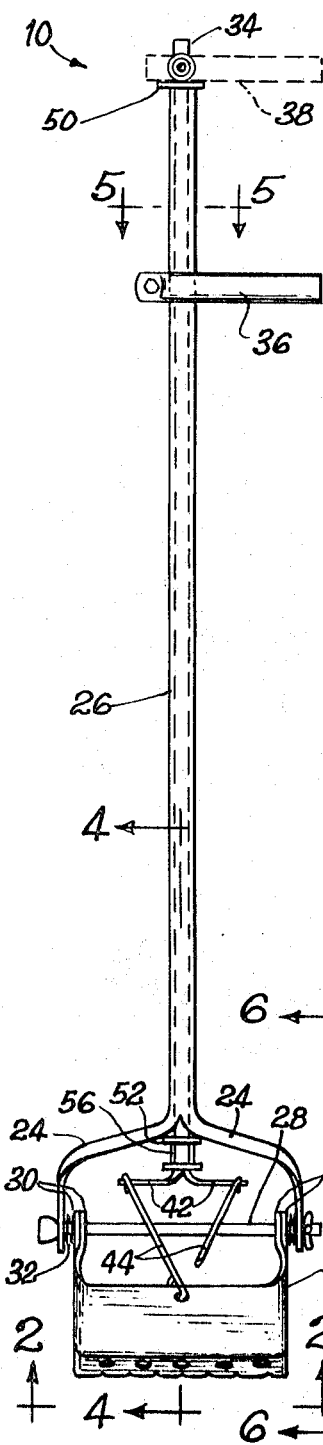
FIG. 1
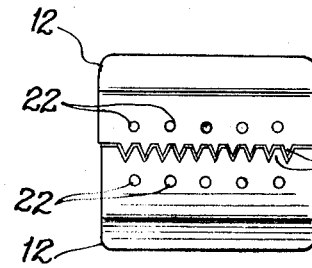
FIG. 2
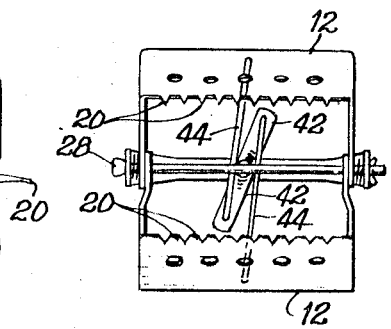
FIG. 3
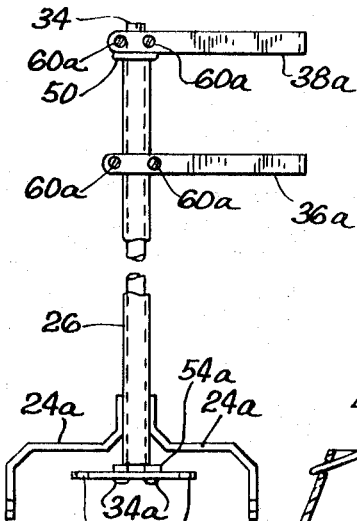
FIG. 7
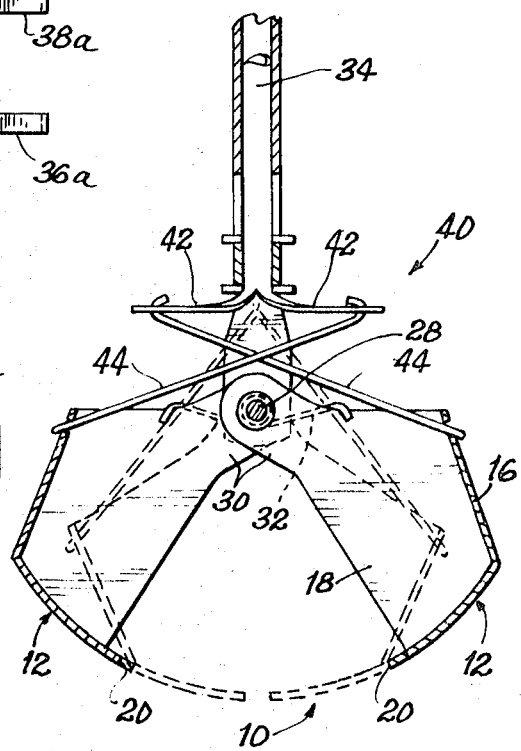
FIG. 4
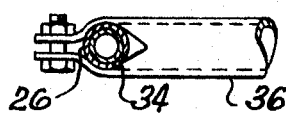
FIG. 5
FIG. 6
FIG. 8
INVENTOR
Jerry Mares
by Burmeister, Palmatier
and Hamby Att'ys

HAND-OPERATED SHOVEL FOR PICKING UP REFUSE

This invention relates to a new and improved hand-operated shovel which will find many applications, but is especially well adapted for picking up pet manure or the like.

The principal object of the present invention is to facilitate the otherwise distasteful task of cleaning up after dogs, cats and other pets. It is an object of the present invention to provide a hand-operated shovel for accomplishing this task.

A more specific object is to provide such a shovel which can be operated very easily with both ands and without any stooping.

A further object is to provide a shovel which is sturdy in construction and low in cost.

Generally, the hand-operated shovel of the present invention comprises a pair of clamshell scoops which are pivotally connected to arms extending laterally from the lower end of a tubular outer shaft. Spring means are provided to bias the scoops to their closed position. An inner shaft is rotatably mounted within the outer shaft. First and second handles are mounted on the upper end portions of the outer and inner shafts so as to extend radially therefrom. The lower end of the inner shaft is provided with a pair of lever arms which are connected to the scoops by means of links. Thus, the scoops can be opened and closed by turning the inner shaft. The shovel is operated by holding the handles in both hands. The scoops are opened by turning the second handle so as to rotate the inner shaft. THe shovel is placed so that the scoops straddle the refuse to be picked up. The scoops are then closed by turning the second handle in the opposite direction. In this way, the refuse may be picked up and dropped as desired.

Further objects and advantages of the present invention will appear from the following description, taken with the accompanying drawings. In which:

FIG. 1 is an elevational view of a shovel to be described as an illustrative embodiment of the present invention.

FIG. 2 is a bottom view of the shovel, with the scoops closed.

FIG. 3 is a bottom view with the scoops open.

FIG. 4 is a fragmentary section taken along the line 4—4 in FIG. 1.

FIG. 5 is a fragmentary section taken along the line 5—5 in FIG. 1.

FIG. 6 is a fragmentary side elevation, taken as indicated by the line 6—6 in FIG. 1.

FIG. 7 is a fragmentary view similar to FIG. 1 but showing a modified construction.

FIG. 8 is a view similar to FIG. 5 but showing a modified construction.

As just indicated, FIG. 1 illustrates a hand-operated shovel 10 having a pair of clamshell scoops 12 (FIG. 4) which are swingable between open and closed positions. Each scoop 12 comprises a bottom wall 14, a sidewall 16 and a pair of end walls 18. When the scoops 12 are closed, the bottom walls 14 come together, as clearly shown in FIG. 2. Preferably, the edges of the bottom walls 14 are formed with meshing teeth 20. One or more openings 22 are preferably formed in each bottom wall 14 to drain off any liquid.

THe clamshell scoops 12 are swingably mounted on a pair of supporting arms 24 which extend laterally from the lower end of a hollow tubular outer shaft 26. The arms 24 are secured to the shaft 26, or formed integrally therewith.

Pivot means are provided between the arms 24 and the scoops 12. The pivot means may assume various forms but are shown in FIG. 1 as comprising a pivot pin or rod 28, secured to the arms 24 and extending through apertured portions 30 of the scoops 12.

Spring means are preferably provided to bias the scoops 12 toward their closed position. As shown to best advantage in FIG. 4, such spring means preferably comprise one or more springs 32, which may assume various forms, but are shown as torsion springs mounted on the rod 28. The ends of the springs 32 are connected to the scoops 12.

To provide for operation of the scoops 12, an inner shaft 34 is rotatably mounted within the hollow outer shaft 26. The scoops 12 are operated by rotating the inner shaft 34 relative to the outer shaft 26.

First and second handles 36 and 38 are secured to the upper end portions of the outer and inner shafts 26 and 34. The handles 36 and 38 extend radially from the shafts 26 and 34, so that the handles can be grasped and manipulated very easily.

An operating mechanism 40 is provided between the inner shaft 34 and the scoops 12. The illustrated mechanism 40 comprises a pair of lever arms 42 extending radially from the lower end of the inner shaft 34. Links 44 are connected between the scoops 12 and the respective arms 42. The links 44 are pivotally connected to the scoops and the arms 42.

As shown in FIG. 1, the supporting arms 24 are formed by splitting, shaping the flattening the lower end portion of the hollow outer shaft 26. Similarly, the lever arms 42 are formed by splitting, shaping and flattening the lower end portion of the inner shaft 34.

To provide for smooth and free rotation of the inner shaft 34, a washer 50 is preferably mounted around the inner shaft 34 between the handle 38 and the upper end of the outer shaft 26. Two washers 52 and 54 are preferably mounted around the lower end portion of the inner shaft 34, with a spacer 56 between the washers. This arrangement insures that the inner shaft 34 will be freely rotatable.

As shown in FIG. 5, the handle 36 is formed with split and flattened end portions 58 which provide curved clamping elements, whereby the handle is clamped around the outer shaft 26. A clamping bolt 60 is inserted through suitable openings in the clamping portions 58. The handle 38 may be essentially the same in construction as the handle 36.

FIG. 7 illustrates a modified construction in which the integral arms 24 replaced with separate arms 249, formed from metal bar stock and welded or otherwise secured to the lower end portion of the outer hollow shaft 26. Similarly, the integral lever arms 42 are replaced by a two-armed bar 42a, secured to the lower end of the inner shaft 34. Any suitable means may be provided to secure the two-armed bar 42a to the inner shaft 34. As shown, the shaft 34 is formed with lugs or flanges 34a extending through suitable openings in the bar 42a and bent over or clenched to provide a secure connection.

To provide for free rotation of the inner shaft 34, a washer 54a is mounted around the inner shaft, between the bar 42a and the lower end of the outer shaft 26.

In FIGS. 7 and 8, the tubular handles 36 and 38 are replaced with handles 36a and 38a in the form of U-bars having their front and rear legs clamped to the shafts 26 and 34 by means of bolts 60a. Each of the handles 36a and 38a employs a pair of clamping bolts 60a. It will be understood that the handles may assume various forms and may be otherwise secured to the shafts. In other respects, the constructions of FIGS. 7 and 8 may be the same as previously described in connection with FIGS. 1-6.

As to either of the disclosed embodiments of the shovel, the scoops 16 may be pushed open by rotating the inner shaft 34 in one direction. Such rotation causes the arms 42 and the links 44 to push open the scoop 12. The springs 32 are effective to close the scoops 12 automatically when the upper handle 38 is released, so as to permit the inner shaft 34 to rotate in the opposite direction.

The shovel 10 may be operated very easily by holding the handles 36 and 38 in both hands. The scoops 12 are opened by turning the upper handle 38 in one direction. The shovel is then placed with the scoops 12 straddling the refuse to be picked up. To cause the scoops 12 to close, the handle 38 is simply released, or is rotated in the opposite direction. The springs 32 cause automatic closing of the scoops 12. By this operating procedure, the refuse can be picked up and dumped as desired.

It will be evident that the shovel can be manipulated very precisely and operated with great facility. The shovel greatly facilitates the task of cleaning up after dogs, cats and other pets.

Various other modifications, alternative constructions and equivalents may be employed, as will be understood by those skilled in the art.

I claim:

1. A hand-operated shovel for picking up refuse, said shovel comprising a pair of clamshell scoops for receiving the refuse, each of said scoops having a bottom wall, a sidewall and a pair of end walls, said side and end walls extending upwardly from said bottom wall for retaining the refuse on the bottom wall, an elongated outer tubular shaft, a pair of laterally offset supporting arms secured to the lower end of said outer shaft, pivot means connected between said arms and said end walls of said clamshell scoops to support said scoops for swinging movement between open and closed positions, said bottom walls of said scoops being brought together when said scoops are in said closed positions, the corresponding end walls of each scoop being brought together when said scoops are in said closed position, spring means biasing said scoops toward said closed position, an elongated inner shaft extending through said tubular outer shaft and rotatably received therein, a first handle extending radially from the upper end portion of said outer shaft, a second handle extending radially from the upper end portion of said inner shaft, and an operating mechanism connected between the lower end of said inner shaft and said scoops for opening and closing said scoops in response to rotary movement of said inner shaft in opposite directions, said spring means being effective to hold said scoops resiliently in said closed position to prevent accidental dumping of the refuse from said scoops, said operating mechanism comprising a pair of lever arms extending radially from the lower end of said inner shaft, and a pair of links connected between said lever arms and said scoops for opening and closing said scoops when said lever arms are turned in opposite directions.

2. A shovel according to claim 1, in which said pivot means comprise a pivot rod extending between said suppporting arms, said scoops having portions swingably mounted on said rod, said spring means comprising at least one torsion spring mounted on said rod and connected to said scoops.

* * * * *